United States Patent
Butters

(10) Patent No.: US 9,397,774 B2
(45) Date of Patent: Jul. 19, 2016

(54) RE-TIMING SAMPLED DATA

(71) Applicant: Snell Limited, Reading, Berkshire (GB)

(72) Inventor: Jeff Butters, Reading (GB)

(73) Assignee: Snell Limited, Reading, Berkshire (GB)

(*) Notice: Subject to any disclaimer, the term of this patent is extended or adjusted under 35 U.S.C. 154(b) by 30 days.

(21) Appl. No.: 14/290,241

(22) Filed: May 29, 2014

(65) Prior Publication Data

US 2014/0359175 A1    Dec. 4, 2014

(30) Foreign Application Priority Data

May 29, 2013    (GB) .................................. 1309558.3

(51) Int. Cl.
| | | |
|---|---|---|
| G06F 3/00 | (2006.01) | |
| G06F 5/00 | (2006.01) | |
| H04J 3/06 | (2006.01) | |
| H04N 21/43 | (2011.01) | |
| G06F 3/06 | (2006.01) | |

(52) U.S. Cl.
CPC .............. H04J 3/0632 (2013.01); H04N 21/43 (2013.01); *G06F 2003/0691* (2013.01)

(58) Field of Classification Search
None
See application file for complete search history.

(56) References Cited

U.S. PATENT DOCUMENTS

| | | | |
|---|---|---|---|
| 5,396,492 A | 3/1995 | Lien | |
| 5,526,362 A | 6/1996 | Thompson et al. | |
| 6,092,126 A | 7/2000 | Rossum | |
| 6,252,919 B1* | 6/2001 | Lin .................. | G10L 21/04 375/355 |
| 6,650,719 B1* | 11/2003 | Baker ................ | H04N 17/004 348/497 |
| 7,263,109 B2* | 8/2007 | Ternovsky .......... | H04L 12/6418 370/503 |
| 2001/0055276 A1* | 12/2001 | Rogers ................ | H04J 3/0632 370/232 |
| 2002/0064248 A1 | 5/2002 | Berens et al. | |
| 2005/0220240 A1* | 10/2005 | Lesso ................ | G06F 5/06 375/372 |
| 2010/0153122 A1* | 6/2010 | Wang ................ | G10L 19/173 704/501 |

FOREIGN PATENT DOCUMENTS

WO    99/59391 A2    11/1999

OTHER PUBLICATIONS

United Kingdom Patent Application No. GB 1309558.3 Search Report, dated Nov. 22, 2013 (1 page).

* cited by examiner

*Primary Examiner* — Elias Mamo
(74) *Attorney, Agent, or Firm* — Michael Best & Friedrich LLP

(57) ABSTRACT

For re-timing sampled data, input data samples at an input data rate are stored in a FIFO buffer and output at an output data rate according to an output clock that is locked to the input data rate in dependence on a loop-filtered measure of the fill level of the said buffer. The frequency of the output clock is additionally controlled by an estimate of the input data rate.

8 Claims, 1 Drawing Sheet

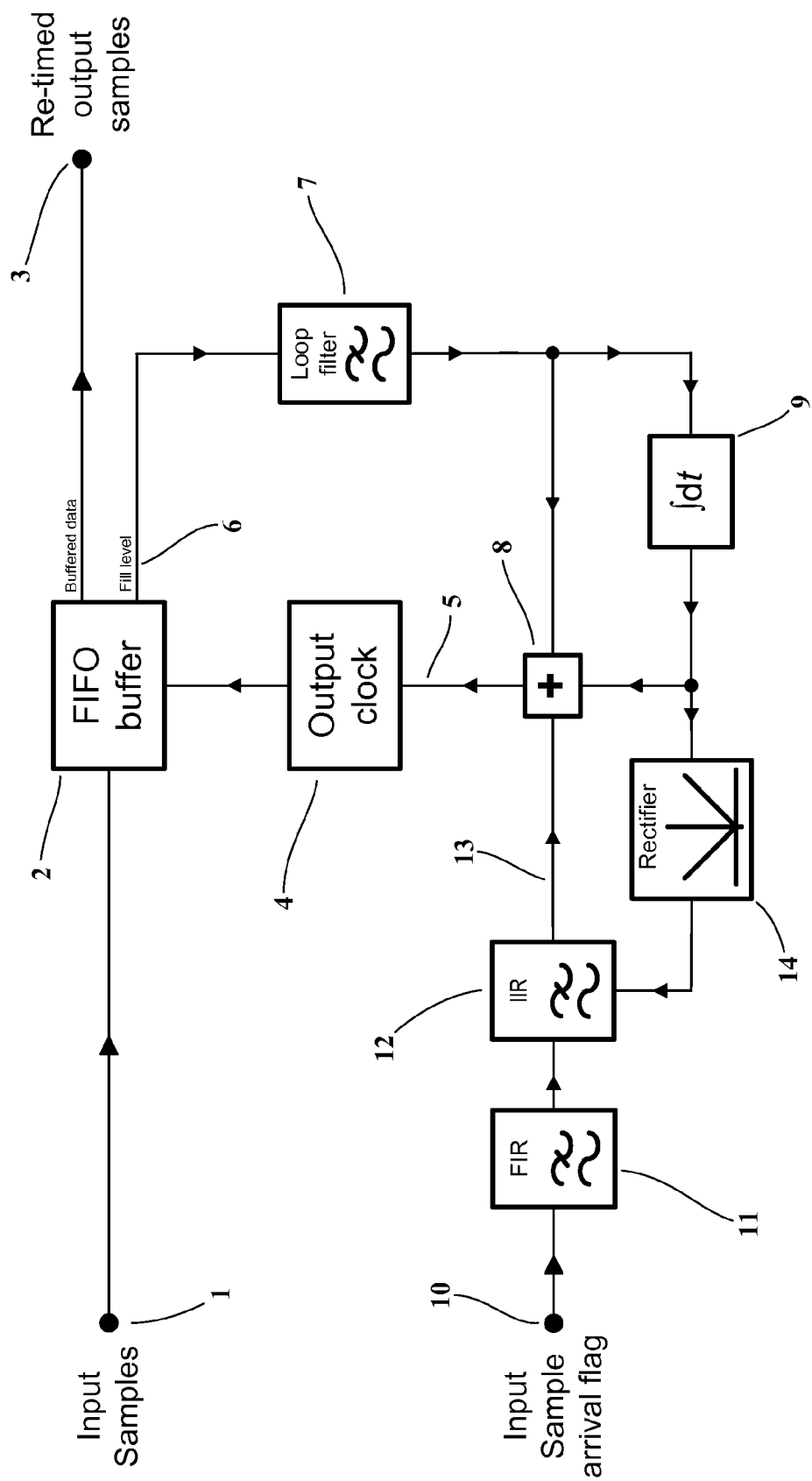

1

RE-TIMING SAMPLED DATA

FIELD OF INVENTION

This invention relates to the re-timing of sampled data.

BACKGROUND OF THE INVENTION

In systems that process sampled data, such as pixel values of a video stream, or audio sample values of an audio stream, it is usually advantageous that the rate of presentation of sample values to the process is maintained at a highly stable value. Interface specifications such as the IEC 60958 standard for digital audio, and the ITU-R Recommendation 656 for digital video, have tight specifications for both the sample rate and its short-term variation or 'jitter'.

However, when routing data between different sources and destinations, it is often convenient to route samples via a time-division multiplex that operates at a rate that is not precisely coupled to the required sample rate of the data that is routed. For example, different types of data may be combined in a common multiplex. And, 'packet-based' routing systems will not deliver data at a constant rate.

There is thus a need for methods of re-timing a stream of sample values for data that maintain the sample rate at a constant value that is the average of a varying input sample rate. And, because different sample rates may be used for the same type of data, for example different audio sampling rates, it is advantageous for the re-timing method to adapt quickly to a new average input rate when the average input sample rate changes.

SUMMARY OF THE INVENTION

The invention consists in methods and apparatus for re-timing sampled data in which input data samples at an input data rate are stored in a FIFO buffer and output at an output data rate according to an output clock that is locked to the input data rate in dependence on a loop-filtered measure of the fill level of the said buffer, wherein the frequency of the said output clock is additionally controlled by an estimate of the said input data rate.

Suitably the said frequency estimate is formed from a filtered average of the number of input samples arriving in a fixed time interval.

Advantageously, the said filtered average is filtered by a variable filter having a characteristic that is varied in dependence on the said loop-filtered measure of the fill level of the said buffer.

In a preferred embodiment, the said characteristic is varied in dependence on the magnitude of an integrated value of the said loop-filtered measure of the fill level of the said buffer.

And, the said variable filter is a recursive filter in which the said characteristic is the degree of recursion.

BRIEF DESCRIPTION OF THE DRAWING

FIG. 1 shows a block diagram of a data re-timing system according to an embodiment of the invention.

DETAILED DESCRIPTION OF THE INVENTION

An example of a system according to the invention is shown in FIG. 1. Input data samples (1) are read into a first in first out (FIFO) buffer (2). The rate of arrival of the input samples (1) is variable. The system 'smoothes' the data rate and outputs re-timed samples (3) which have minimal short- and medium-term jitter. The invention is particularly suitable for situations where there are both short-term perturbations of the input sample rate which must be eliminated; and, abrupt changes in the average sample rate which must be followed without undue delay.

The output of samples from the buffer (2) is controlled by an output clock (4), which is controlled by a frequency control signal (5). Ideally the buffer (2) should be 'half-full' so that both increases and decreases in the input sampling rate can be corrected. A fill-level signal (6) is output from the buffer that has a positive value when the buffer is more than half-full and a negative value when the buffer is less than half-full. Typically this signal would be proportional to the number of stages of the buffer that currently contain data.

The fill-level signal (6) is low pass-filtered in a loop filter (7), and provides proportional control of the frequency of the output clock (4) via an adder (8). The output of the loop filter (7) is also input to an integrator (9), whose output is combined with the proportional control in the adder (8), so that the frequency of the output clock is maintained at the average input sample rate, and the average fill level of the buffer (2) is maintained at half-full. The characteristics of the loop filter (7) and the gains of the proportional and integral component of the frequency control signal (5) are chosen according to the known art of phase-locked-loop design so that the rate at which the output samples (3) are delivered from the buffer (2) is constant and has minimal jitter.

Because of the requirement for low jitter in the output sample rate, the bandwidth of the above-described control loop will be very narrow. An abrupt change in the input sample rate will thus not be reflected quickly in the output sample rate, and the buffer may well not have sufficient capacity and will 'overflow' or 'underflow'. This difficulty is overcome by forming an estimate of the input sample frequency that can be applied quickly to the output clock as will now be described.

Whenever an input sample (1) is presented to the system and input to the buffer (2), an input sample flag (10) is input to a cascaded pair of low-pass filters (11) (12). Typically the input sample flag (10) would comprise a pulse with a duration less than the shortest expected sample period of the input data (1); this could be generated automatically by the buffer (2).

The filtered flags signal (13) at the output of the cascaded filters (11) (12) comprises an estimate of the input sample rate. The low pass characteristic of the filters averages the flags and delivers an average value representing the mark-space ratio of the flags. The filtered-flags signal (13) is combined with the proportional and integral frequency control signals in the adder (8), so that the centre frequency of the phase-locked loop via the loop filter (7) is adjusted to the estimated input sample rate.

Clearly the filtered flags signal (13) should not introduce jitter to the frequency of the output clock (4). This suggests a low bandwidth for the cascaded filters (11) (12). However, low bandwidth would prevent quick adaptation to a sudden change in input sample rate. The bandwidth of the filter (12) is therefore made variable, and is automatically adjusted in proportion to the magnitude of the output from the integrator (9). The integrator output is rectified (14) and used to control the bandwidth of the filter (12).

A suitable variable filter (12) is a recursive (IIR) filter in which the filtered signal is the value of an accumulator, whose input is obtained by subtracting the current accumulated value from the input to the filter, and dividing the result by a constant value before adding it to the accumulated value. The bandwidth of the filter is controlled by changing the value of the constant, the larger the constant, the greater the degree of recursion, and the smaller the bandwidth of the filter. Typically the division is implemented by right-shifting binary data. A suitable filter has a shift value of up to 10 places, enabling the response to be adjusted over a range of 1,024 times.

A suitable choice for the filter (11) is an FIR filter that takes a running average of the number input sample arrival flags (10) occurring in a fixed time interval. The fixed interval should be chosen to be no less than the longest expected time between the arrival of successive input samples.

Thus, when a sudden change in the input sample frequency occurs, the fill level of the buffer (2) starts to steadily increase or decrease and the output of the integrator (9) either increases or decreases at an accelerating rate. This increased magnitude of the integrator output is reflected at the output of the rectifier (14) which increases the bandwidth, and reduces the group delay, of the variable filter (12) by reducing its degree of recursion. The new average input data rate is thus communicated quickly via the connection (13) to the adder (8) and so controls the frequency of the output clock (4) to move towards the new input data rate.

After the change in input data rate, the buffer level returns to half-full, and the feedback loop via the loop filter (7) causes the output of the integrator (9) to move towards zero. This small magnitude output from the integrator (9) causes a small output from the rectifier (14) which causes the degree of recursion of the variable filter (14) to increase. The bandwidth of the path via the filters (11) (12) to the adder (8) thus becomes very narrow, so that the output clock (4) remains jitter free due to the operation of the proportional and integral control via the loop filter (7).

There are other ways in which the output of the loop filter (7) can be used to control the bandwidth of the variable filter (12). For example the filter could be controlled directly by the loop filter output. Or, the variable filter (12) could be controlled by a mix of the proportional control at the output of the filter (7), and the integral control at the output of the integrator (9). This mix could be the frequency control signal (5).

It is also possible to combine the cascaded filters (11) (12) into a single variable filter that delivers a temporally-filtered estimate of the average input sample rate, and the temporal filter characteristic is controlled in dependence on the output of the loop filter (7).

The invention claimed is:

1. A method of re-timing sampled data in a digital data processing system, the method comprising:
   receiving input data samples at an input data rate;
   storing said input data samples in a FIFO buffer having a fill level;
   forming a loop-filtered measure of said fill level;
   forming an estimate of the input data rate;
   controlling the frequency of an output clock in accordance with said loop-filtered measure and said estimate; and
   outputting data samples from the FIFO buffer at an output data rate determined by the output clock;
   in which the said estimate is formed from a filtered average of the number of input samples arriving in a fixed time interval, in which the said filtered average is filtered by a variable filter having a characteristic that is varied in dependence on the said loop-filtered measure of the fill level of the said buffer, and in which said characteristic is varied in dependence on the magnitude of an integrated value of the said loop-filtered measure of the fill level of the said buffer.

2. The method according to claim 1 in which the said variable filter is a recursive filter in which the said characteristic is the degree of recursion.

3. The method according to claim 1 in which the said input data is selected from the group consisting of audio data and video data.

4. An apparatus for re-timing sampled data, the apparatus comprising:
   a FIFO buffer for receiving input data samples at an input rate and having a fill level;
   an output clock having a frequency and connected to the FIFO buffer to determine an output data rate at which data samples are output from the FIFO buffer;
   a loop filter receiving said fill level and providing a loop-filtered measure of said fill level; and
   a circuit for determining an estimate of said input data rate;
   wherein the frequency of the output clock is controlled in accordance with said loop-filtered measure and said estimate, and
   in which the said circuit forms a filtered average of the number of input samples arriving in a fixed time interval, in which the said filtered average is filtered by a variable filter having a characteristic that is varied in dependence on the said loop-filtered measure of the fill level of the said buffer, and in which the said characteristic is varied in dependence on the magnitude of an integrated value of the said loop-filtered measure of the fill level of the said buffer.

5. The apparatus according to claim 4 in which the said variable filter is a recursive filter in which the said characteristic is the degree of recursion.

6. A non-transitory computer program product configured to cause programmable apparatus to implement a method comprising:
   receiving input data samples at an input data rate;
   storing said input data samples in a FIFO buffer having a fill level;
   forming a loop-filtered measure of said fill level;
   forming an estimate of the input data rate;
   controlling the frequency of an output clock in accordance with said loop-filtered measure and said estimate; and
   outputting data samples from the FIFO buffer at an output data rate determined by the output clock, and
   in which said estimate is formed from a filtered average of the number of input samples arriving in a fixed time interval, in which said filtered average is filtered by a variable filter having a characteristic that is varied in dependence on the said loop-filtered measure of the fill level of the said buffer, and in which the said characteristic is varied in dependence on the magnitude of an integrated value of the said loop-filtered measure of the fill level of the said buffer.

7. The product according to claim 6 in which the said variable filter is a recursive filter in which the said characteristic is the degree of recursion.

8. The product according to claim 6 in which the said input data is selected from the group consisting of audio data and video data.

* * * * *